United States Patent
Watanabe et al.

(10) Patent No.: US 11,424,913 B2
(45) Date of Patent: Aug. 23, 2022

(54) KEY EXCHANGE SYSTEM AND KEY EXCHANGE METHOD

(71) Applicant: Nippon Telegraph and Telephone Corporation, Tokyo (JP)

(72) Inventors: Hiroki Watanabe, Yokosuka (JP);
Tsunekazu Saito, Musashino (JP);
Koutarou Suzuki, Musashino (JP);
Shigenori Ohashi, Yokosuka (JP);
Shigeru Fujimura, Yokosuka (JP);
Atsushi Nakadaira, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 336 days.

(21) Appl. No.: 16/621,000

(22) PCT Filed: Jun. 20, 2018

(86) PCT No.: PCT/JP2018/023380
§ 371 (c)(1),
(2) Date: Dec. 10, 2019

(87) PCT Pub. No.: WO2018/235845
PCT Pub. Date: Dec. 27, 2018

(65) Prior Publication Data
US 2020/0127818 A1    Apr. 23, 2020

(30) Foreign Application Priority Data

Jun. 21, 2017 (JP) .............................. JP2017121633

(51) Int. Cl.
*H04L 9/08* (2006.01)
*G06F 21/10* (2013.01)
*H04L 9/06* (2006.01)

(52) U.S. Cl.
CPC .......... *H04L 9/0822* (2013.01); *G06F 21/105* (2013.01); *H04L 9/0637* (2013.01)

(58) Field of Classification Search
None
See application file for complete search history.

(56) References Cited

U.S. PATENT DOCUMENTS 5,588,060 A    12/1996  Aziz
2016/0358253 A1*  12/2016  Liao ....................... G06Q 40/04
(Continued)

FOREIGN PATENT DOCUMENTS

JP    H08-8895 A    1/1996
JP    2017-50763 A   3/2017

OTHER PUBLICATIONS

McCorry et al., (Authenticated Key Exchange over Bitcoin), Springer International Publishing Switzerland; 2015 (Year: 2015).*
(Continued)

*Primary Examiner* — William J. Goodchild
(74) *Attorney, Agent, or Firm* — Kilpatrick Townsend & Stockton LLP

(57) ABSTRACT

A key exchange system method safely conceal secret information recorded on a blockchain. A first terminal includes a license issuing unit that generates a first transaction including a first public key, a first key storage region that retains a first secret key, and a first encrypting and decrypting unit that generates a common key using deal-specific information, a second public key, and the first secret key, and a second terminal includes a license requesting unit that generates a second transaction including the second public key, a second key storage region that retains a second secret key, and a second encrypting and decrypting unit that generates the common key using deal-specific information, the first public key, and the second secret key. The first encrypting and decrypting unit encrypts secret information (Continued)

using the common key. The second encrypting and decrypting unit decrypts the encrypted secret information using the common key.

7 Claims, 8 Drawing Sheets

(56) References Cited

U.S. PATENT DOCUMENTS

2017/0046651 A1* 2/2017 Lin .................. G06Q 10/08
2017/0207917 A1* 7/2017 Davis ................ H04L 9/0841
2018/0241551 A1 8/2018 Fujimura et al.

OTHER PUBLICATIONS

McCorry et al., "Authenticated Key Exchange Over Bitcoin", Springer International Publishing, Switzerland, 2015, pp. 3-20, 18 pages.
International Search Report, PCT Patent Application No. PCT/JP2018/023380, dated Sep. 25, 2018.
Written Opinion, PCT Patent Application No. PCT/JP2018/023380, dated Sep. 25, 2018.
Bitcoin: Digital Megalithic Currency Without Human Intervention, 2013.
TCP/IP, $1^{st}$ Edition, Sep. 1, 2013, pp. 147-149.
International Preliminary Report on Patentability, PCT Patent Application No. PCT/JP2018/023380, dated Jan. 2, 2020.

* cited by examiner

KEY EXCHANGE SYSTEM AND KEY EXCHANGE METHOD

TECHNICAL FIELD

The present invention relates to a key exchange system and a key exchange method having forward secrecy on a blockchain.

BACKGROUND ART

In recent years, digital cryptocurrencies such as bitcoin (registered trademark) have been spreading. In such cryptocurrencies, a mechanism capable of guaranteeing reliability without requiring centralized management has been introduced. A technique called blockchain has been used in the cryptocurrencies such as bitcoin (registered trademark). In the blockchain technique, reliability of information exchanged among participants is guaranteed by a process of consensus building in a network formed by all the participants. Soundness of the blockchain is maintained by preventing illegal acts such as tampering and double spending in the entire system (Non-patent document 1). The blockchain is obtained by collecting, in units called blocks, deal information (transactions) of a cryptocurrency and others among the participants. The blockchain functions as one enormous ledger shared by the participants in a P2P (Peer To Peer) network.

According to Non-patent document 1, as illustrated in FIG. 8, deal information (transactions) of a cryptocurrency is represented by a chain of digital signatures. As illustrated in FIG. 9, generated transactions are collected into a block by a blockchain generating device under predetermined conditions. A new block is linked to the existing blockchain in the P2P network. The updated blockchain is shared by computers (terminals of the participants). In this process, the blockchain generating device gathers transactions not included in the blockchain and generates a new block (an n+1-th block) including the gathered transactions and a hash value (256 bits) of a block (an n-th block) at the end of the present blockchain. The blockchain generating device searches for an appropriate value with which all of several leading bits of the hash value are "0" when a cryptographic hash function (SHA-256) is applied to the new block (the n+1-th block). The blockchain generating device links the new block (the n+1-th block) including the appropriate value to the end of the present blockchain and broadcasts the new block. In this way, the blockchain is constructed on the P2P network. Thereafter, a blockchain verifying device verifies the broadcasted new block and shares a result of the verification with other terminals.

In a blockchain premised to be laid open to the public represented by bitcoin (registered trademark), all kinds of deal information registered are laid open to the public. When secret information is included in the deal information, the secret information needs to be encrypted and then stored in a transaction. For example, Patent document 1 discloses a technique applied to license management of digital contents. In the technique disclosed in Patent document 1, when an encrypted digital content is used, a common key for decrypting the content is passed to a user together with license information of use via the blockchain. The common key is secret information not desired to be known by people other than the user. In the technique disclosed in Patent document 1, key exchange is carried out using a public key cryptography via the blockchain and an encrypted common key is registered in the blockchain.

PRIOR ART DOCUMENT

Patent Document

Patent document 1: Japanese Patent Application Publication No. 2017-50763

Non-Patent Document

Non-patent document 1: Kenji Saito, "Bitcoin-Digital Megalith Money without Human Presence", WIDE technical report

SUMMARY OF THE INVENTION

Problem to be Solved by the Invention

A transaction registered in the blockchain is shared by all participants and permanently accumulated in the blockchain. In a general blockchain represented by bitcoin (registered trademark), it is difficult to cancel or tamper the content of a once-registered transaction later. Therefore, anybody can retroactively acquire secret information encrypted by a certain user and included in a transaction.

For example, in the technique disclosed in Patent document 1, secret information is encrypted by a public key of a user and decrypted by a secret key paired with the public key. If the secret key used for the decryption leaks, all kinds of secret information for which the secret key is used can be decrypted. That is, with a method of simply using a public key cryptography, it is difficult to safely conceal encrypted secret information over a long term.

An objective of the present invention devised in view of such circumstances is to provide a key exchange system and a key exchange method for safely concealing secret information over a long term when the secret information is recorded on a blockchain.

Means for Solving the Problem

One aspect of the present invention is a key exchange system including a first terminal and a second terminal connected to each other via a network in which a blockchain is constructed. The first terminal includes: a license issuing unit that generates a first transaction including a first public key and an issued license responding to a license request; a first key storage region that retains a first secret key; and a first encrypting and decrypting unit that generates a common key using deal-specific information, which is at least one of the first transaction, a second transaction, and a parameter of a specific block, together with a second public key and the first secret key. The second terminal includes: a license requesting unit that generates the second transaction including the second public key and the license request; a second key storage region that retains a second secret key; and a second encrypting and decrypting unit that generates the common key using the deal-specific information, the first public key, and the second secret key. The first encrypting and decrypting unit encrypts secret information using the common key generated by the first encrypting and decrypting unit. The second encrypting and decrypting unit decrypts the encrypted secret information acquired via the network using the common key generated by the second encrypting and decrypting unit.

One aspect of the present invention is a key exchange method executed by a key exchange system including a first terminal and a second terminal connected to each other via a network in which a blockchain is constructed. The key exchange method includes: retaining a first secret key by the first terminal; retaining a second secret key by the second terminal; generating a second transaction including a second public key and a license request by the second terminal; generating a first transaction including a first public key and an issued license responding to the license request by the first terminal; generating a common key by the first terminal using deal-specific information, which is at least one of the first transaction, the second transaction, and a parameter of a specific block, together with the second public key, and the first secret key; encrypting secret information by the first terminal using the common key generated by the first terminal; generating the common key by the second terminal using the deal-specific information, the first public key, and the second secret key; and decrypting the encrypted secret information acquired via the network by the second terminal using the common key generated by the second terminal.

Effect of the Invention

According to the present invention, there is provided a key exchange system and a key exchange method for safely concealing secret information over a long term when the secret information is recorded on a blockchain.

MODE FOR CARRYING OUT THE INVENTION

First Embodiment (Key Exchange System)

Figure 1:
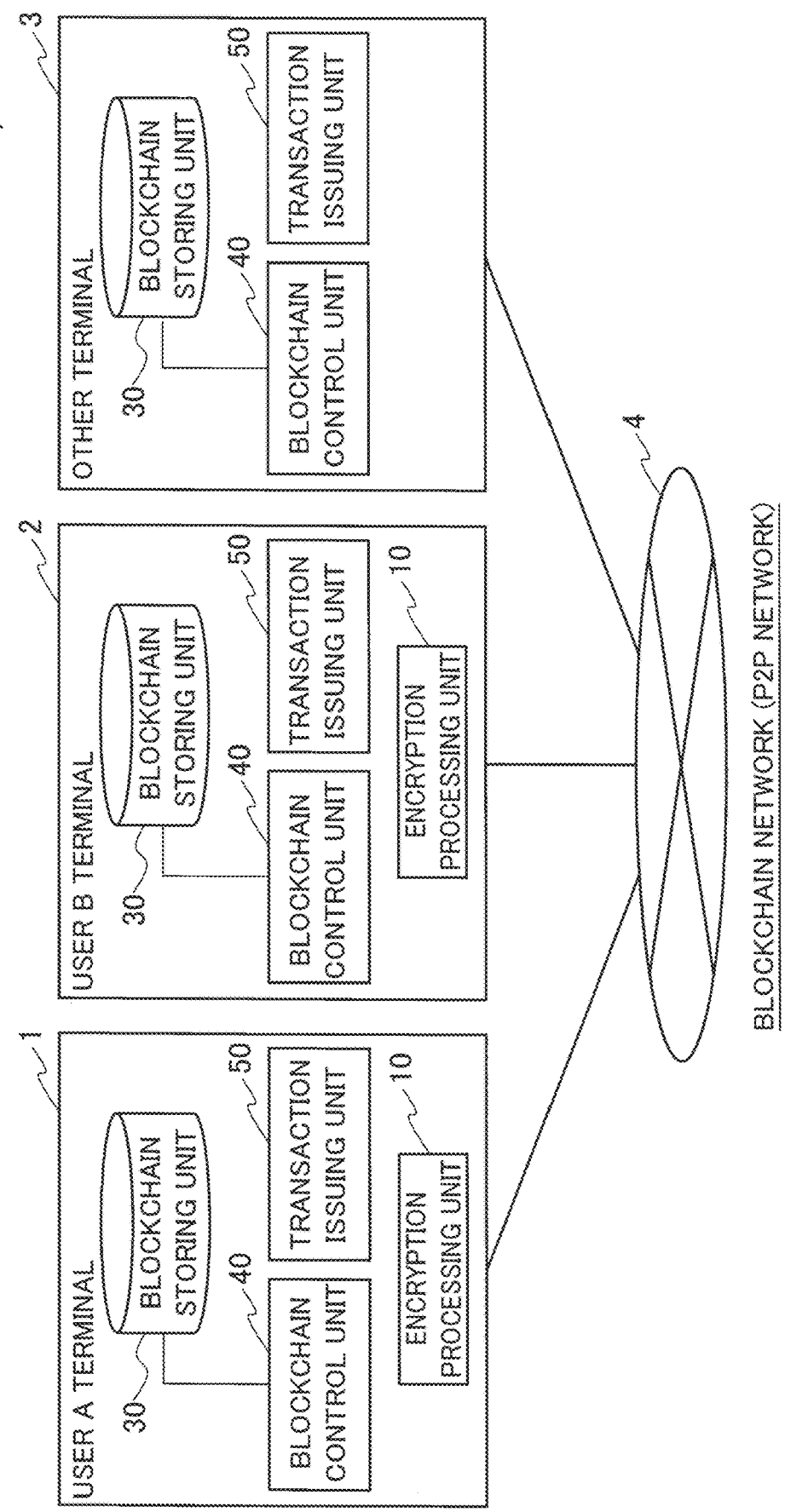
FIG. 1 is a diagram illustrating the configuration of a key exchange system according to an embodiment.

FIG. 1 is a diagram illustrating the configuration of a key exchange system 5 according to a first embodiment. The key exchange system 5 includes multiple terminals (a user A terminal 1, a user B terminal 2, and another terminal 3). The terminals are information processing devices used by the users. Each of the multiple terminals may be, for example, a personal computer (PC) or a smartphone. The multiple terminals are connected in an independent distributed manner via a P2P network 4 (a blockchain network; simply referred to as network as well) to be capable of communicating with one another. Note that the number of the multiple terminals included in the key exchange system 5 illustrated in FIG. 1 is an example and is not limited to this. For example, the key exchange system 5 may include two or more other terminals 3.

A program for realizing a deal of a digital cryptocurrency is installed in each of the multiple terminals configuring the key exchange system 5. The terminals acquire a blockchain and a transaction via the P2P network 4. The multiple terminals monitor illegal acts and share a sole blockchain. The transaction treated by the key exchange system 5 includes evidence data of a deal clearly describing a sender and a destination and attached with an electronic signature of the sender.

Each of the multiple terminals configuring the key exchange system 5 functions as a blockchain generating device, a blockchain verifying device, or a transaction generating device according to a role in deals of the digital cryptocurrency.

The blockchain generating device links a new block to an existing blockchain, in which blocks including multiple transactions are linked, to generate an updated blockchain. The new block includes a transaction generated after generation of the existing blockchain. The new block generated by the blockchain generating device is shared by the other terminals via the P2P network 4. In this way, a blockchain is constructed on the P2P network 4.

The blockchain verifying device verifies the blockchain generated by the blockchain generating device. A result of the verification of the blockchain verifying device is shared by the other terminals via the P2P network 4.

The transaction generating device generates a transaction involved in the deal of the digital cryptocurrency. The transaction generated by the transaction generating device is shared by the other terminals via the P2P network 4.

Each of the multiple terminals (the user A terminal 1, the user B terminal 2, and the other terminal 3) includes an encryption processing unit 10, a blockchain storing unit 30, a blockchain control unit 40, and a transaction issuing unit 50.

The encryption processing unit 10 executes processing concerning, for example, encryption and decryption. Details of the encryption processing unit 10 are explained below. In the following explanation, the other terminal 3 is excluded from terminals that share secret information S. Therefore, in FIG. 1, the encryption processing unit 10 of the other terminal 3 is not illustrated.

The blockchain storing unit 30 is a storage device that stores the blockchain shared by the multiple terminals as explained above. For example, the blockchain storing unit 30 may be configured by at least one of a semiconductor storage device and a magnetic storage device.

The blockchain control unit 40 executes control concerning storage of a blockchain. In particular, the blockchain control unit 40 has a role of retaining the latest blockchain in the terminal (causing the blockchain storing unit 30 to store the latest blockchain) in cooperation with the other terminals in an independent distributed manner. For example, the blockchain control unit 40 may read out a blockchain from the blockchain storing unit 30 according to a request from the encryption processing unit 10 and output the blockchain to the encryption processing unit 10.

The transaction issuing unit 50 generates a transaction involved in a deal, for example, when the terminal functions as the transaction generating device. The transaction issuing unit 50 broadcasts the generated transaction to the other terminals via the P2P network 4.

Figure 2:
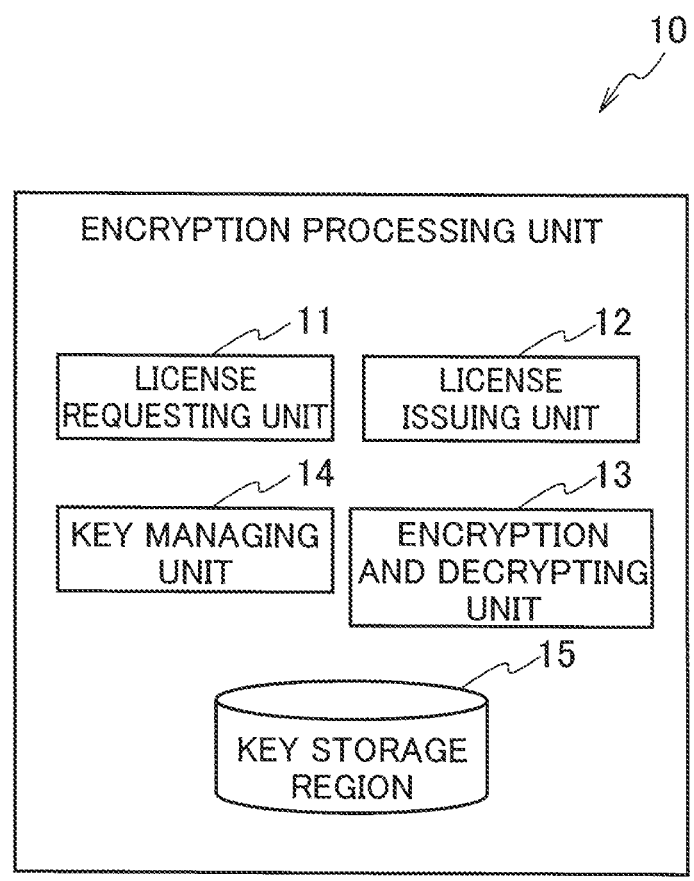
FIG. 2 is a diagram illustrating the configuration of an encryption processing unit.

FIG. 2 is a diagram illustrating a detailed configuration of the encryption processing unit 10. The encryption processing unit 10 includes a license requesting unit 11, a license issuing unit 12, an encrypting and decrypting unit 13, a key managing unit 14, and a key storage region 15.

The license requesting unit 11 generates a transaction including a public key and a license request. The public key is generated by the key managing unit 14. The license requesting unit 11 outputs the generated transaction to the transaction issuing unit 50. The transaction generated by the license requesting unit 11 is broadcasted to the other terminals by the transaction issuing unit 50 via the P2P network 4.

The license issuing unit 12 generates a transaction including a public key and an issued license. The license issuing unit 12 outputs the generated transaction to the transaction issuing unit 50. The transaction generated by the license issuing unit 12 is broadcasted to the other terminals by the transaction issuing unit 50 via the P2P network 4.

The encrypting and decrypting unit 13 executes processing concerning encryption and decryption. The encrypting and decrypting unit 13 acquires, from the P2P network 4, a public key of a partner that shares the secret information S. The encrypting and decrypting unit 13 calculates a session key (a disposable encryption key effective for only a certain time) using a secret key or the like of the user stored in the key storage region 15. The encrypting and decrypting unit 13 encrypts the secret information S using the calculated session key. The encrypting and decrypting unit 13 decrypts the encrypted secret information S using the session key. In the decryption, the encrypting and decrypting unit 13 may use the session key stored in the key storage region 15 or may calculate a session key again. The encrypted secret information S can be registered in a blockchain by being included in the transaction by a predetermined method.

The key managing unit 14 executes processing concerning a public key and a secret key. The key managing unit 14 executes generation, reference, and deletion of a public key and a secret key. The key managing unit 14 is used by other modules (e.g., the license requesting unit 11, the license issuing unit 12, and the encrypting and decrypting unit 13). In this embodiment, an ECDH (Elliptic Curve Diffie-Hellman) key exchange scheme is used for the generation of a public key and a secret key.

The key storage region 15 stores (retains) the secret key generated by the key managing unit 14. The key storage region 15 may temporarily store the session key calculated by the encrypting and decrypting unit 13.

(Key Exchange Method)

A procedure in which a user A and a user B share the secret information S on the blockchain of the key exchange system 5 (a key exchange method in the key exchange system 5 according to this embodiment) is explained. The user A is a user of the user A terminal 1 (a first terminal). The user B is a user of the user B terminal 2 (a second terminal).

Figure 3:
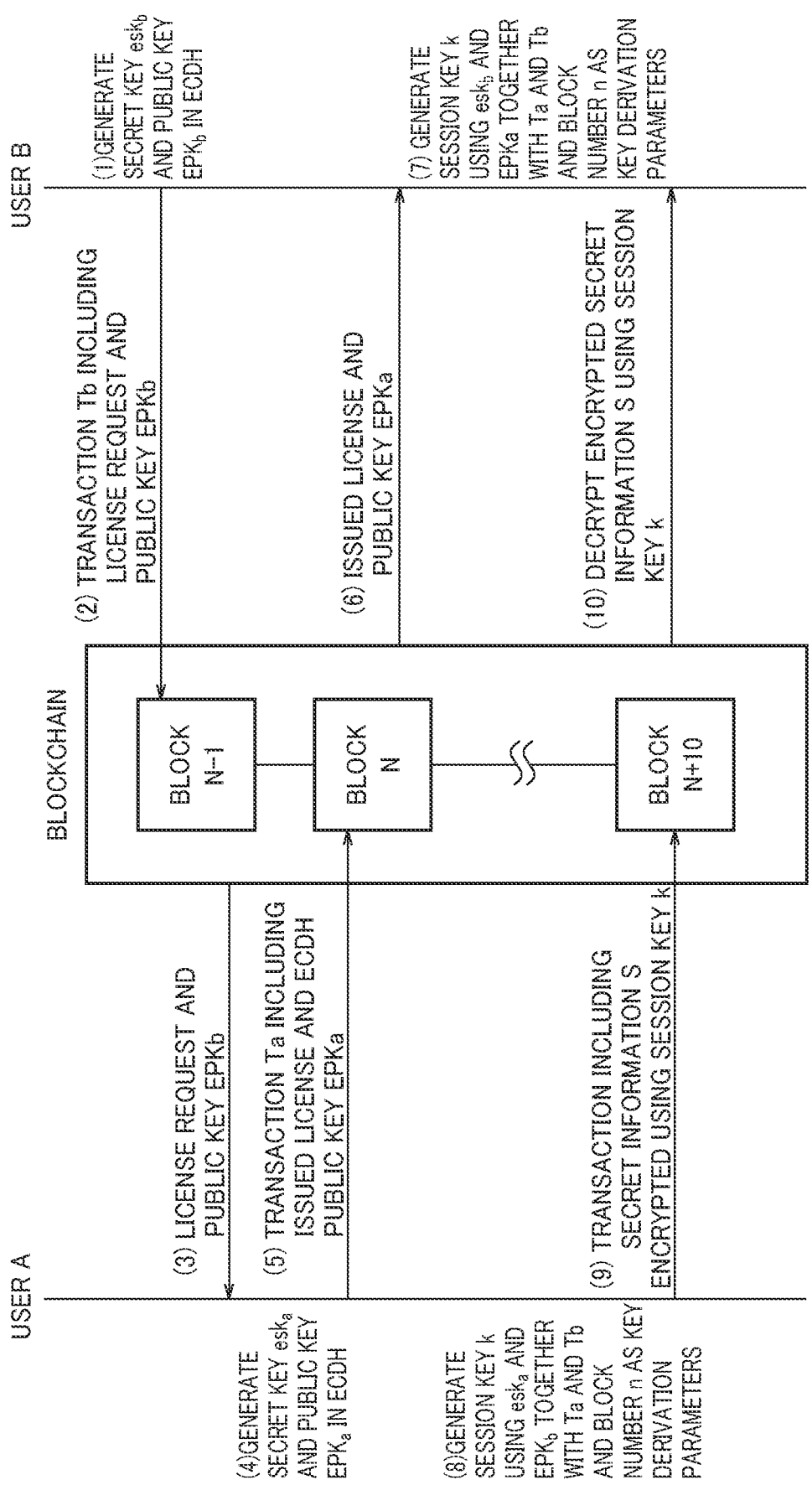
FIG. 3 is a sequence chart for explaining a key exchange method according to the embodiment.

FIG. 3 is a sequence chart for explaining the key exchange method according to this embodiment. The user A illustrated in FIG. 3 means the user A terminal 1. The user B illustrated in FIG. 3 means the user B terminal 2.

In this example, the secret information S is information not open to the public generated by the user A. FIG. 3 illustrates a sequence of key exchange in which the user B requests a license of the user A concerning inspection (or use) of the secret information S and the user A approves the request and open the secret information S to only the user B. All communications are performed by transactions issued by the users. Exchange of data such as a public key is performed via the blockchain. As explained above, ECDH key exchange is adopted in this embodiment. The user A and the user B generate keys using the same elliptical curve. For example, a program for generating keys using a specific one elliptical curve may be installed in the user A terminal 1 and the user B terminal 2. At this time, the program installed in common in the user A terminal 1 and the user B terminal 2 executed by a processor to function as the encryption processing unit 10.

First, the key managing unit 14 of the user B terminal 2 generates a secret key $esk_b$ (a second secret key) and a public key $EPK_b$ (a second public key) using an elliptical curve cryptography ((1) of FIG. 3). The key storage region 15 (a second key storage region) of the user B terminal 2 retains the generated secret key $esk_b$.

The user B terminal 2 generates a transaction $T_b$ (a second transaction) including a license request (that is, information indicating that a license for, for example, inspection of the secret information S is requested) and the public key $EPK_b$ for the ECDH key exchange and broadcasts the transaction $T_b$ via the P2P network 4 ((2) of FIG. 3). In detail, the transaction $T_b$ is generated by the license requesting unit 11 and output to the transaction issuing unit 50. The transaction $T_b$ is broadcasted by the transaction issuing unit 50. The license request may include an identifier, a flag value, or the like for specifying the secret information S.

In the P2P network 4, a block (a block N−1 illustrated in FIG. 3) including the transaction $T_b$, in which the public key $EPK_b$ is stored, is added to the blockchain by a process for generating an updated blockchain. For example, the other terminal 3 functioning as the blockchain generating device may generate a new block. After the block including the transaction $T_b$ is added to the blockchain, the user A terminal 1 confirms the license request included in the transaction $T_b$. The user A terminal 1 acquires the public key $EPK_b$ ((3) of FIG. 3). The public key $EPK_b$ of the user B is shared by the user A according to the process of (1) to (3) of FIG. 3.

Subsequently, the key managing unit 14 of the user A terminal 1 generates a secret key $esk_a$ (a first secret key) and a public key $EPK_a$ (a first public key) using an elliptical curve cryptography ((4) of FIG. 3). The key storage region 15 (a first key storage region) of the user A terminal 1 retains the generated secret key $esk_a$.

The user A terminal 1 generates a transaction $T_a$ (a first transaction) including an issued license (that is, information indicating that, for example, inspection of the secret information S is approved and a license is issued for the license request) and the public key $EPK_a$ for the ECDH key exchange and broadcasts the transaction $T_a$ via the P2P network 4 ((5) of FIG. 3). In detail, the transaction $T_a$ is generated by the license issuing unit 12 and output to the transaction issuing unit 50. The transaction $T_a$ is broadcasted by the transaction issuing unit 50. The issued license may include an identifier, a flag value, or the like for specifying the license request from the user B.

In the P2P network 4, a block (a block N illustrated in FIG. 3) including the transaction $T_a$, in which the public key $EPK_a$ is stored, is added to the blockchain by a process for generating an updated blockchain. For example, the other terminal 3 functioning as the blockchain generating device may generate an updated blockchain. After the block including the transaction $T_a$ is added to the blockchain, the user B terminal 2 confirms the issued license included in the transaction $T_a$. The user B terminal 2 acquires the public key $EPK_a$ ((6) of FIG. 3). The public key $EPK_a$ of the user A is shared by the user B according to the process of (4) to (6) of FIG. 3.

In the ECDH key exchange, the following Expression (A) holds:

$$\sigma = esk_a EPK_b = esk_b EPK_a \qquad (A)$$

A value σ calculated by a public key of a partner and a secret key of a user is the same value for the user A and the user B. Therefore, the user A and the user B are capable of generating the same key (a common key) from the value σ using a key derivation function KDF determined beforehand. The user A and the user B can encrypt and decrypt, in a common key encryption scheme such as AES-GCM, the secret information S using the common key obtained by the key derivation function KDF.

The common key is calculated by giving values to parameters of the key derivation function KDF. If the common key is calculated using only the value σ as a parameter of the key derivation function KDF, it is likely that all kinds of information encrypted by the common key are decrypted when the secret key of the user A (or the secret key of the user B) leaks. Therefore, "related transactions" and "a parameter of a related block (a specific block)" recognized by both of the user A and the user B are further used as parameters of the key derivation function KDF. Consequently, the common key calculated by the key derivation function KDF is a session key, that is, a disposable encryption key effective for a certain time.

In this embodiment, a session key k is represented by the following Expression (B):

$$K = KDF(\sigma \| T_a \| T_b \| N) \qquad (B)$$

The value σ of Expression (B) is calculated by the above Expression (A). As indicated by Expression (B), the transaction $T_b$ including the license request and the transaction $T_a$ including the issued license are used as "related transactions". As indicated by Expression (B), a number N of a block in which the transaction $T_a$ is stored is used as "a parameter of a related block". The transactions $T_a$ and $T_b$ and the number N of the block (a unique number allocated to the block) are values decided for each deal. That is, the transactions $T_a$ and $T_b$ and the number N of the block are information peculiar to each deal on the P2P network 4. Therefore, a session key calculated using the transactions $T_a$ and $T_b$ and the number N of the block is a key peculiar to each deal.

The encrypting and decrypting unit 13 (a first encrypting and decrypting unit) of the user A terminal 1 calculates the value σ from the secret key $esk_a$ and the public key $EPK_b$ according to Expression (A). The user A terminal 1 generates the session key (a common key) k according to Expression (B) ((8) of FIG. 3; a first common key generating step).

The user A terminal 1 broadcasts a transaction including the secret information S encrypted using the session key k to the other terminals via the P2P network 4 ((9) of FIG. 3). In detail, the encrypting and decrypting unit 13 encrypts the secret information S using the session key. The encrypted secret information S is included in the transaction by the predetermined method and output to the transaction issuing unit 50. The transaction issuing unit 50 broadcasts the generated transaction to the other terminals via the P2P network 4.

On the other hand, the encrypting and decrypting unit 13 (a second encrypting and decrypting unit) of the user B terminal 2 calculates the value σ from the secret key $esk_b$ and the public key $EPK_a$ according to Expression (A). The user B terminal 2 generates the session key (the common key) k according to Expression (B) ((7) of FIG. 3; a second common key generating step).

The encrypting and decrypting unit 13 of the user B terminal 2 decrypts, using the session key k, the encrypted secret key S acquired via the P2P network 4 ((10) of FIG. 3).

As explained above, according to this embodiment, the secret information S is encrypted and decrypted by the common key k generated according to the above Expressions (A) and (B). The common key k is calculated using "related transactions" and "a parameter of a related block", which are values decided for each deal. Accordingly, k is a session key peculiar to each deal. Therefore, the key exchange system (and the key exchange method on the system) according to this embodiment has forward secrecy and can safely conceal secret information over a long term when the secret information is recorded on a blockchain.

Second Embodiment

The secret information S is shared by the two persons (the user A and the user B) in the key exchange system 5 according to the first embodiment. The key exchange system 5 according to a second embodiment is expanded such that the secret information S is shared by a group of a large number of people.

In this embodiment, users belonging to the group use a common key used in the entire group (a group common key). The group common key is generated by a root user having a management authority among the users belonging to the group. The users belonging to the group encrypt shared information with the group common key and arrange the shared information in a place where the other users can acquire the shared information (for example, register the shared information in a blockchain). The users belonging to the group decrypt encrypted shared information with the group common key. The shared information is one kind of information that should be concealed from users other than the users of the group.

In the key exchange system 5 according to the first embodiment, the secret information S encrypted using the session key is transmitted and received between the two persons. In the first embodiment, the secret information S (a target of encryption and decryption by the session key) between the two persons may be, for example, information itself or may be a password or an encryption key for accessing the information. In the key exchange system 5 according to this embodiment, an encrypted group common key is transmitted and received between the root user and each of "users (client users) belonging to the group other than the root user". That is, in this embodiment, the secret information S between the two persons is the group common key. In this embodiment, transmission and reception of the group common key between the two persons is executed by the number of client users. In the following explanation, a session key between a root user $U_1$ and a client user $U_d$ is represented as $k_d$ (d is an integer equal to or larger than 2). In the following explanation, the group common key is represented as k.

(Key Exchange System)

The configuration of the key exchange system 5 according to this embodiment is similar to the configuration in the first embodiment. The user A terminal 1 illustrated in FIG. 1 corresponds to a terminal of the root user $U_1$. The user B terminal 2 illustrated in FIG. 1 corresponds to a terminal of the client user $U_d$. When the group is formed by n (n is an integer equal to or larger than 3) users, each of client users $U_2, U_3, \ldots,$ and $U_n$ has a peculiar terminal. That is, the key exchange system 5 according to this embodiment can have a configuration including multiple the user B terminals 2 illustrated in FIG. 1.

In the first embodiment, the encryption processing unit 10 of the user A terminal 1 has the same configuration as the encryption processing unit 10 of the user B terminal 2. In this embodiment, the root user $U_1$ manages, for example, generation of the group common key. Therefore, an encryption processing unit 10a of the terminal of the root user $U_1$ has a configuration different from the configuration of an encryption processing unit 10b of the terminal of the client user $U_d$.

Figure 4:
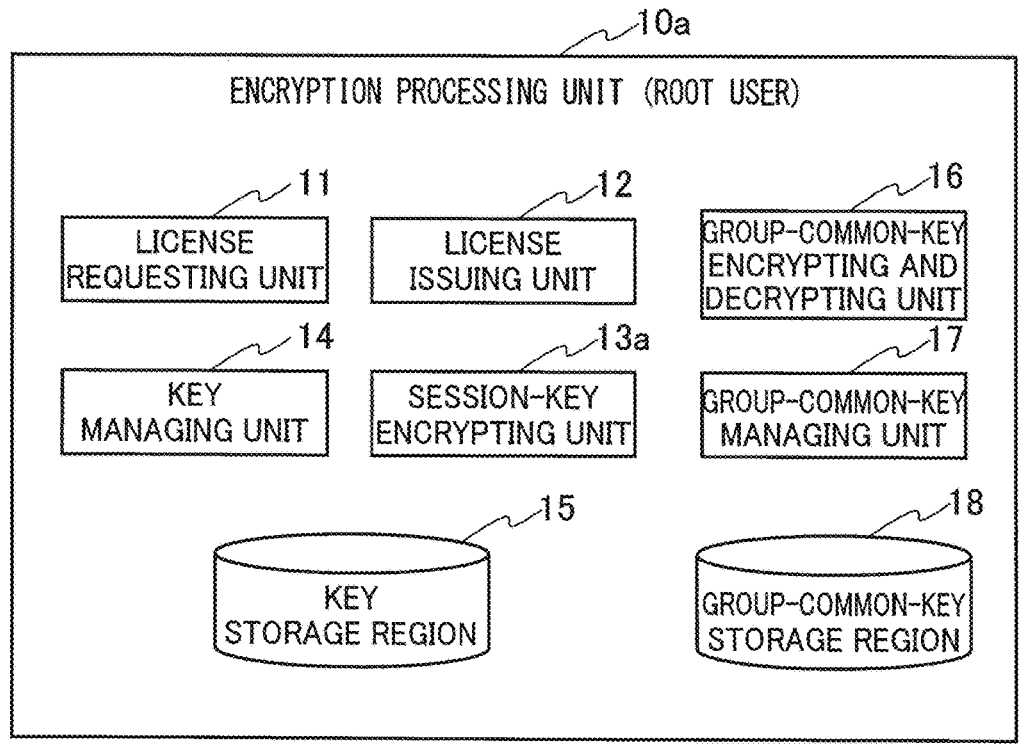
FIG. 4 is a diagram illustrating the configuration of an encryption processing unit for a root user.

FIG. 4 is a diagram illustrating the configuration of the encryption processing unit 10a for the root user $U_1$. The encryption processing unit 10a includes the license requesting unit 11, the license issuing unit 12, a session-key encrypting unit 13a, the key managing unit 14, the key storage region 15, a group-common-key encrypting and decrypting unit 16, a group-common-key managing unit 17, and a group-common-key storage region 18. Explanation of the license requesting unit 11, the license issuing unit 12, the key managing unit 14, and the key storage region 15 is omitted because the explanation is the same as the explanation in the first embodiment (see FIG. 2).

The session-key encrypting unit 13a acquires a public key of the client user $U_d$ from the P2P network 4. The session-key encrypting unit 13a calculates a session key between the root user $U_1$ and the client user $U_d$ using a secret key or the like of the root user $U_1$ stored in the key storage region 15. The session-key encrypting unit 13a encrypts, using the calculated session key, a group common key acquired via the group-common-key managing unit 17. The encrypted group common key can be registered in the blockchain by being included in a transaction by the predetermined method.

The group-common-key encrypting and decrypting unit 16 encrypts shared information using a group common key stored in the group-common-key storage region 18. The encrypted shared information can be registered in the blockchain by being included in the transaction by the predetermined method. The group-common-key encrypting and decrypting unit 16 decrypts the encrypted shared information using the group common key.

The group-common-key managing unit 17 executes processing concerning the group common key. The group-common-key managing unit 17 executes generation, reference, and deletion of the group common key. The group-common-key managing unit 17 updates the group common key, for example, at the time of deletion of the client user $U_d$. For example, when the client user $U_d$ is added to the group, the group-common-key managing unit 17 executes association with the group common key and the added client user $U_d$ and stores the group common key in the group-common-key storage region 18. On the other hand, when the client user $U_d$ is deleted, the group-common-key managing unit 17 discards the group common key stored in the group-common-key storage region 18 to that point. The group-common-key managing unit 17 generates a group common key anew. That is, in the case of the deletion of the client user $U_d$ (withdrawal from the group), the group-common-key managing unit 17 generates a group common key anew in order to prevent illegal use by the withdrawn client user $U_d$.

The group-common-key storage region 18 stores (retains) the group common key generated by the group-common-key managing unit 17.

Figure 5:
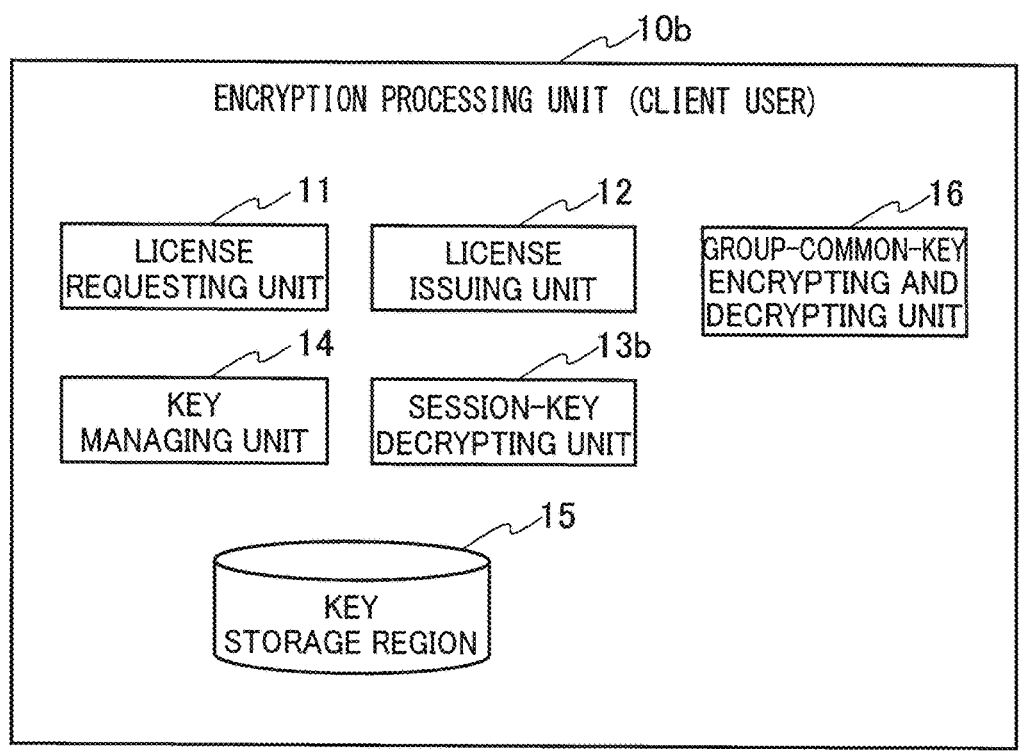
FIG. 5 is a diagram illustrating the configuration of an encryption processing unit for a client user.

FIG. 5 is a diagram illustrating the configuration of the encryption processing unit 10b for the client user $U_d$. The encryption processing unit 10b includes the license requesting unit 11, the license issuing unit 12, a session-key decrypting unit 13b, the key managing unit 14, the key storage region 15, and the group-common-key encrypting and decrypting unit 16. Explanation of the license requesting unit 11, the license issuing unit 12, the key managing unit 14, and the key storage region 15 is omitted because the explanation is the same as the explanation in the first embodiment (see FIG. 2).

The session-key decrypting unit 13b acquires a public key of the root user $U_1$ from the P2P network 4. The session-key decrypting unit 13b calculates a session key between the root user $U_1$ and the client user $U_d$ using a secret key or the like of the client user $U_d$ stored in the key storage region 15. The session-key decrypting unit 13b decrypts, using the calculated session key, an encrypted group common key acquired from the blockchain.

The group-common-key encrypting and decrypting unit 16 encrypts share information using the group common key decrypted by the session-key decrypting unit 13b. The encrypted shared information can be registered in the blockchain by being included in a transaction by the predetermined method. The group-common-key encrypting and decrypting unit 16 decrypts the encrypted shared information using the group common key. The group-common-key encrypting and decrypting unit 16 of the encryption processing unit 10b has the same configuration and the same function as the configuration and the function of the group-common-key encrypting and decrypting unit 16 of the encryption processing unit 10a except that a method of acquisition of the group common key is different.

(Key Exchange Method)

A procedure in which the client user $U_d$ shares a group common key k with the root user $U_1$ on the blockchain is explained below. The root user $U_1$ is a user of the user A terminal 1. The client user $U_d$ is a user of the user B terminal 2. As in an example illustrated in FIG. 6 and FIG. 7, when multiple client users $U_d$ are present, each of the client users $U_d$ uses the user B terminal 2 of the client user $U_d$.

Figure 6:
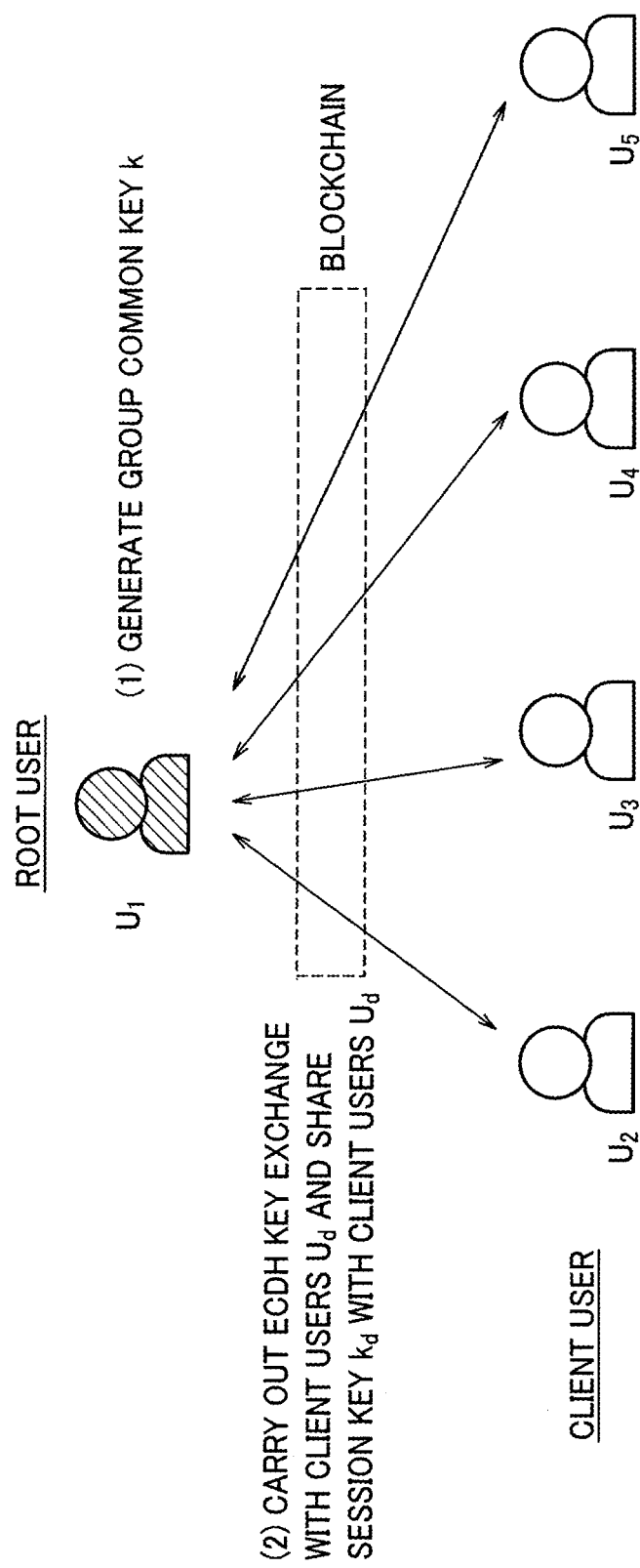
FIG. 6 is a sequence chart for explaining a key exchange method according to another embodiment.
Figure 7:
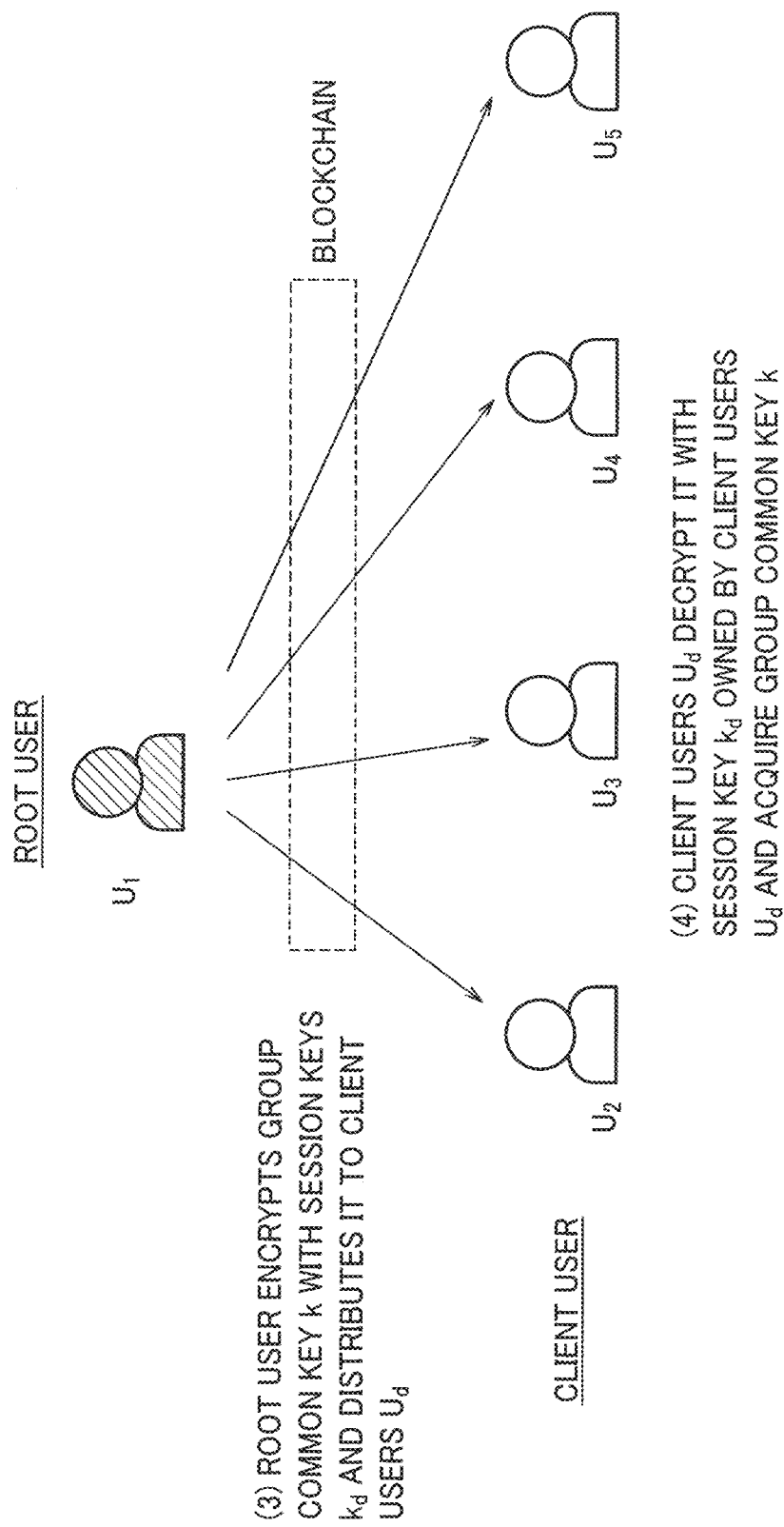
FIG. 7 is a sequence chart following FIG. 6.
Figure 8:
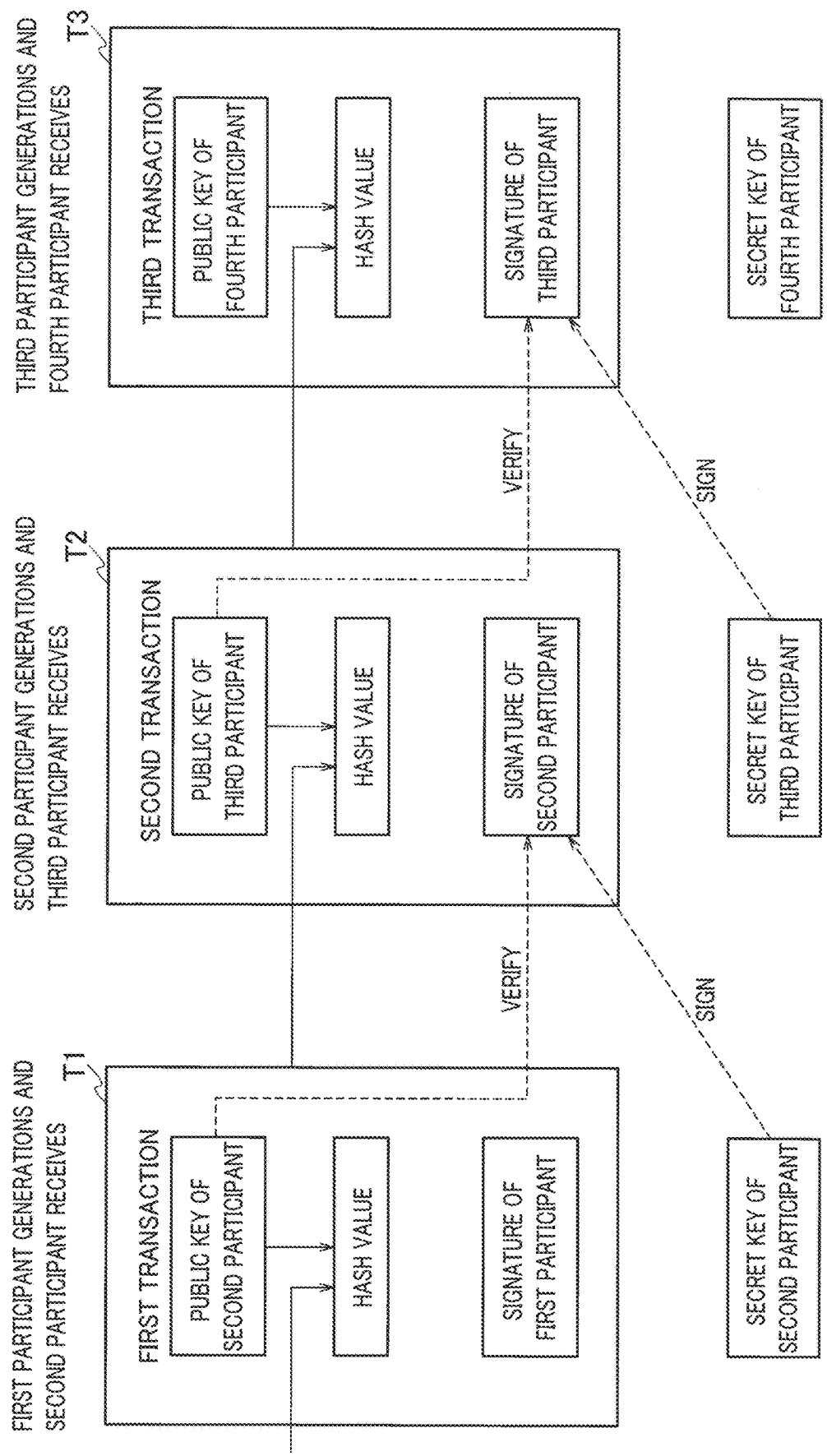
FIG. 8 is a diagram for explaining a signature in a general cryptocurrency.
Figure 9:
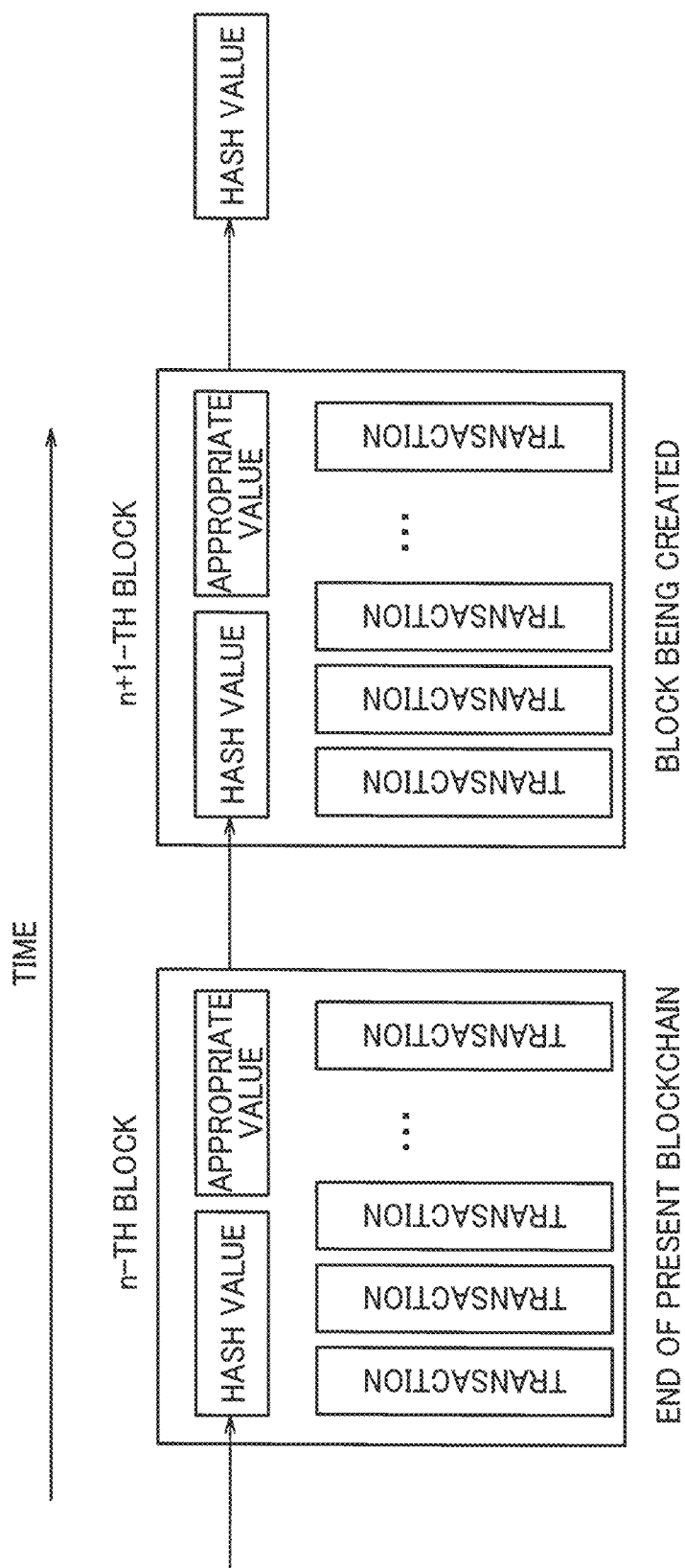
FIG. 9 is a diagram for explaining a blockchain in the general cryptocurrency.

FIG. 6 is a sequence chart for explaining the key exchange method according to this embodiment. FIG. 7 is a sequence chart following FIG. 6. The root user $U_1$ illustrated in FIG. 6 and FIG. 7 means the user A terminal 1. Each of the client users $U_d$ (d=2 to 5) illustrated in FIG. 6 and FIG. 7 means the user B terminal 2.

The group-common-key managing unit 17 of the user A terminal 1 generates the group common key k ((1) of FIG. 6). The group common key k is one kind of information that should be concealed from users other than the users (the root user $U_1$ and the client users $U_d$) of the group.

The root user $U_1$ carries out ECDH key exchange between the root user $U_1$ and the client users $U_d$ and shares a session key $k_d$ ((2) of FIG. 6).

The session key $k_d$ is different for each of the client users $U_d$. The root user $U_1$ encrypts the group common key k with the session key $k_d$ and distributes the group common key k to the client users $U_d$ ((3) of FIG. 7).

The client user $U_d$ decrypts the group common key k with the session key $k_d$ and acquires the group common key k ((4) of FIG. 7).

The root user $U_1$ executes, for each of the client users $U_d$, the key exchange method for each of the client users $U_d$ using the session key $k_d$ ((2) of FIG. 6 and (3) and (4) of FIG. 7). The key exchange method executed using the session key $k_d$ corresponds to the key exchange method in the first embodiment executed using the secret information S as the group common key k. That is, explanation of details of the key exchange method executed using the session $k_d$ is omitted because the details of the key exchange method is the same as the details of the key exchange method in the first embodiment. In the example illustrated in FIG. 6 and FIG. 7, the root user $U_1$ performs key exchange (sharing of the group common key k) in order for each of the four client users $U_d$.

As explained above, in this embodiment, as in the first embodiment, the key exchange system and the key exchange method for safely concealing the secret information S over a long term when the secret information S is recorded on the blockchain are realized. In the second embodiment, it is possible to safely share the secret information S over a long term in a group of a large number of people.

The embodiments explained above are explained as representative examples. It is evident for those skilled in the art that many changes and substitutions are possible within the gist and the scope of the present invention. Therefore, the present invention should not be interpreted as being limited by the embodiments. Various modifications and changes are possible without departing from the scope of the claims.

For example, in the embodiments explained above, the ECDH key exchange scheme is used when a key is generated. A DH key exchange scheme, an RSA key exchange scheme, an MQV key exchange scheme, an HMQV key exchange scheme, or the like may be used instead of the ECDH key exchange system.

In the embodiments explained above, when the session key is calculated, all of the transactions $T_a$ and $T_b$ and the number N of the block are used as "related transactions" and "a parameter of a related block". Since a lot of information is included as information (deal-specific information) peculiar to the related transactions and the related block, the common key for safely concealing the secret information S over a long term is more surely generated. However, if decided between the user A and the user B beforehand, at least a part (at least one) of the transactions $T_a$ and $T_b$ and the parameter of the related block may be used as the deal-specific information. If decided between the user A and the user B beforehand, values different from the transactions $T_a$ and $T_b$ and the number N of the block may be used as the deal-specific information. For example, a number N−1 of a block in which the transaction $T_b$ is stored may be used as "a parameter of a related block". For example, a size of a block of the number N or N−1 of the block may be used as "a parameter of a related block" rather than the number N or N−1 of the block. For example, transactions different from the transactions $T_a$ and $T_b$ may be used as "related transactions". As "related transactions", data of the entire transactions may be used or data of a part of the transactions (for example, a part of data including at least an electronic signature) may be used.

Many aspects of the content of this disclosure is illustrated as a series of operation executed by hardware capable of executing a program command. The hardware capable of executing the program command is not limited to a personal computer, a smartphone, and the like and includes, for example, a dedicated computer, a work station, a PCS (Personal Communications System; a personal mobile communication system), a mobile (cellular) telephone having a data processing function, a tablet terminal, a game machine, an electronic note pad, a laptop computer, a GPS (Global Positioning System) receiver, or other programmable data processing devices. Note that, in the embodiments, various operation or control methods are executed by a program command (software) and/or a program module or the like executed by one or more processors. The one or more processors include, for example, a microprocessor, a CPU (Central Processing Unit), an ASIC (Application Specific Integrated Circuit), a DSP (Digital Signal Processor), a PLD (Programmable Logic Device), an FPGA (Field Programmable Gate Array), or a combination of any ones of these devices.

EXPLANATION OF THE REFERENCE NUMERALS

1 terminal (user A terminal)
2 terminal (user B terminal)
3 terminal (other terminal)
5 key exchange system
10 encryption processing unit
10*a* encryption processing unit (for a root user)
10*b* encryption processing unit (for a client user)
11 license requesting unit
12 license issuing unit
13 encrypting and decrypting unit
13*a* session-key encrypting unit
13*b* session-key decrypting unit
14 key managing unit
15 key storage region
16 group-common-key encrypting and decrypting unit
17 group-common-key managing unit
18 group-common-key management region
30 blockchain storing unit
40 blockchain control unit
50 transaction issuing unit

The invention claimed is:
1. A key exchange system comprising a first terminal and a second terminal connected to each other via a network in which a blockchain is constructed, wherein
the first terminal comprises:
a license issuing unit that generates a first transaction including a first public key and an issued license responding to a license request from the second terminal;
a first key storage region that retains a first secret key; and
a first encrypting and decrypting unit that:
acquires a second public key from a block including a second transaction in the blockchain;
generates the first secret key and the first public key,
generates a first common key using deal-specific information, including one of the first transaction, the second transaction, and a parameter of a specific block, together with the second public key and the first secret key, and
encrypts secret information using the first common key;
the second terminal comprises:
a license requesting unit that generates the second transaction including the second public key and the license request;
a second key storage region that retains a second secret key; and
a second encrypting and decrypting unit that:
generates the second secret key and the second public key,
acquires the first public key from a block including the first transaction in the blockchain,
generates a second common key using the deal-specific information, the first public key, and the second secret key, acquires the encrypted secret information from a block including the encrypted secret information in the blockchain, and decrypts the encrypted secret information acquired via the network using the second common key generated by the second encrypting and decrypting unit.

2. The key exchange system according to claim 1, wherein the parameter of the specific block is a unique number allocated to a block in which the first transaction or the second transaction is stored.

3. The key exchange system according to claim 1, wherein the parameter of the specific block is a size of a block in which the first transaction or the second transaction is stored.

4. The key exchange system according to claim 1, wherein the secret information is a group common key, and the second terminal is capable of acquiring shared information encrypted by the group common key via the network.

5. The key exchange system according to claim 4, wherein a plurality of second terminals are present, and the plurality of second terminals respectively generate second common keys different from one another.

6. The key exchange system according to claim 1, wherein the first public key, the second public key, the first secret key, and the second secret key are generated in an ECDH key exchange scheme.

7. A key exchange method executed by a key exchange system including a first terminal and a second terminal connected to each other via a network in which a blockchain is constructed, the key exchange method comprising:

generating a second secret key and a second public key by the second terminal;

retaining the second secret key in storage by the second terminal;

generating a second transaction including the second public key and a license request by the second terminal, wherein the second transaction is added to the blockchain;

acquiring the second public key and the license request from the blockchain by the first terminal;

generating a first secret key and a first public key by the first terminal;

retaining the first secret key in storage by the first terminal;

generating a first transaction including the first public key and an issued license responding to the license request by the first terminal, wherein the first transaction is added to the blockchain;

acquiring the first public key and the issued license from the blockchain by the first terminal;

generating a second common key by the second terminal using deal-specific information including the first transaction, the second transaction, and a parameter of a specific block, together with the first public key and the second secret key;

generating a first common key by the first terminal using the deal-specific information together with the second public key, and the first secret key, wherein the first common key and the second common key have the same value;

encrypting secret information by the first terminal using the first common key generated by the first terminal;

generating a secret information transaction including the encrypted secret information by the first terminal, wherein the secret information transaction is added to the blockchain;

acquiring the encrypted secret information from the blockchain by the second terminal; and decrypting the encrypted secret information acquired via the network by the second terminal using the second common key generated by the second terminal.

* * * * *